United States Patent
Litman et al.

(10) Patent No.: US 8,191,059 B1
(45) Date of Patent: May 29, 2012

(54) SYSTEM, METHOD AND COMPUTER PROGRAM PRODUCT FOR INSTALLING AT LEAST A PORTION OF A PROGRAM UTILIZING A WORKFLOW THAT MODELS AN INSTALLATION PROCESS

(75) Inventors: Giora Litman, Binyamina (IL); Ran Efrat, Bnei Zion (IL); Yishay Levanoni, Or-Yehuda (IL)

(73) Assignee: Amdocs Software Systems Limited, Dublin (IE)

( * ) Notice: Subject to any disclaimer, the term of this patent is extended or adjusted under 35 U.S.C. 154(b) by 1258 days.

(21) Appl. No.: 11/463,856

(22) Filed: Aug. 10, 2006

(51) Int. Cl.
G06F 9/445 (2006.01)
G06F 9/44 (2006.01)

(52) U.S. Cl. ......... 717/174; 717/168; 717/121; 717/101

(58) Field of Classification Search .......... 717/168–178, 717/101, 121
See application file for complete search history.

(56) References Cited

U.S. PATENT DOCUMENTS

| | | | |
|---|---|---|---|
| 6,553,563 B2* | 4/2003 | Ambrose et al. | 717/116 |
| 7,210,143 B2* | 4/2007 | Or et al. | 717/174 |
| 7,340,520 B1* | 3/2008 | Jordan et al. | 709/226 |
| 7,406,424 B2* | 7/2008 | Cheeniyil et al. | 705/301 |
| 7,406,483 B2* | 7/2008 | Leymann et al. | 717/174 |
| 2001/0044738 A1* | 11/2001 | Elkin et al. | 705/8 |
| 2005/0049906 A1* | 3/2005 | Leymann et al. | 705/8 |
| 2006/0069605 A1* | 3/2006 | Hatoun | 705/9 |
| 2006/0161900 A1* | 7/2006 | Srinivasamurthy et al. | 717/132 |
| 2006/0184926 A1* | 8/2006 | Or et al. | 717/168 |
| 2006/0195816 A1* | 8/2006 | Grandcolas et al. | 717/101 |
| 2007/0016902 A1* | 1/2007 | Shozaki et al. | 717/174 |
| 2007/0220510 A1* | 9/2007 | Bell et al. | 717/174 |

FOREIGN PATENT DOCUMENTS

| | | | |
|---|---|---|---|
| EP | 0778535 A2 | | 5/2001 |
| WO | WO 03/040887 A2 | | 5/2003 |

OTHER PUBLICATIONS

"FLEXnet InstallShield 12 Windows" www.macrovision.com , © 1990-2006.
Senkul et al. "Chapter 5 Workflow Technologies" Sep. 30, 2003 p. 85-114.

* cited by examiner

*Primary Examiner* — Li Zhen
*Assistant Examiner* — Marina Lee
(74) *Attorney, Agent, or Firm* — Zilka-Kotab, PC (57) ABSTRACT

A system, method and computer program product are provided for installing at least a portion of a program. In use, an installation process is modeled as a workflow. Further, at least a portion of a program is installed utilizing the workflow. In one optional embodiment, at least the portion of the program may include an upgrade to a pre-existing program.

14 Claims, 5 Drawing Sheets

SYSTEM, METHOD AND COMPUTER PROGRAM PRODUCT FOR INSTALLING AT LEAST A PORTION OF A PROGRAM UTILIZING A WORKFLOW THAT MODELS AN INSTALLATION PROCESS

FIELD OF THE INVENTION

The present invention relates to program installation, and more particularly to techniques for installing programs.

BACKGROUND

Generally, programs or portions thereof (e.g. upgrades, etc.) are typically installed utilizing installation programs. One example of an installation program includes the INSTALLSHIELD installation program. In use, such installation programs execute an installation process which, in turn, installs at least a portion of a program in a desired operating environment.

The aforementioned installation process may be very complicated in some cases. For example, multiple actions may need to be executed, some with complex relationships with respect to each other. Unfortunately, the currently available installation programs merely provide a linear model for modeling the installation process.

This is mainly because such installation programs employ a sequential approach for an installation process, where tasks are run one after the other in a predefined, fixed flow with little or no flexibility or adaptation for every specific environment. While customizing and extending the functionality of programs, such as the INSTALLSHIELD installation program, is possible, great effort is involved in doing so which makes such approach much less attractive.

There is thus a need for overcoming these and/or other problems associated with the prior art.

SUMMARY

A system, method and computer program product are provided for installing at least a portion of a program. In use, an installation process is modeled as a workflow. Further, at least a portion of a program is installed utilizing the workflow. In one optional embodiment, the portion or the program may include an upgrade to a pre-existing program.

DETAILED DESCRIPTION

Figure 1:
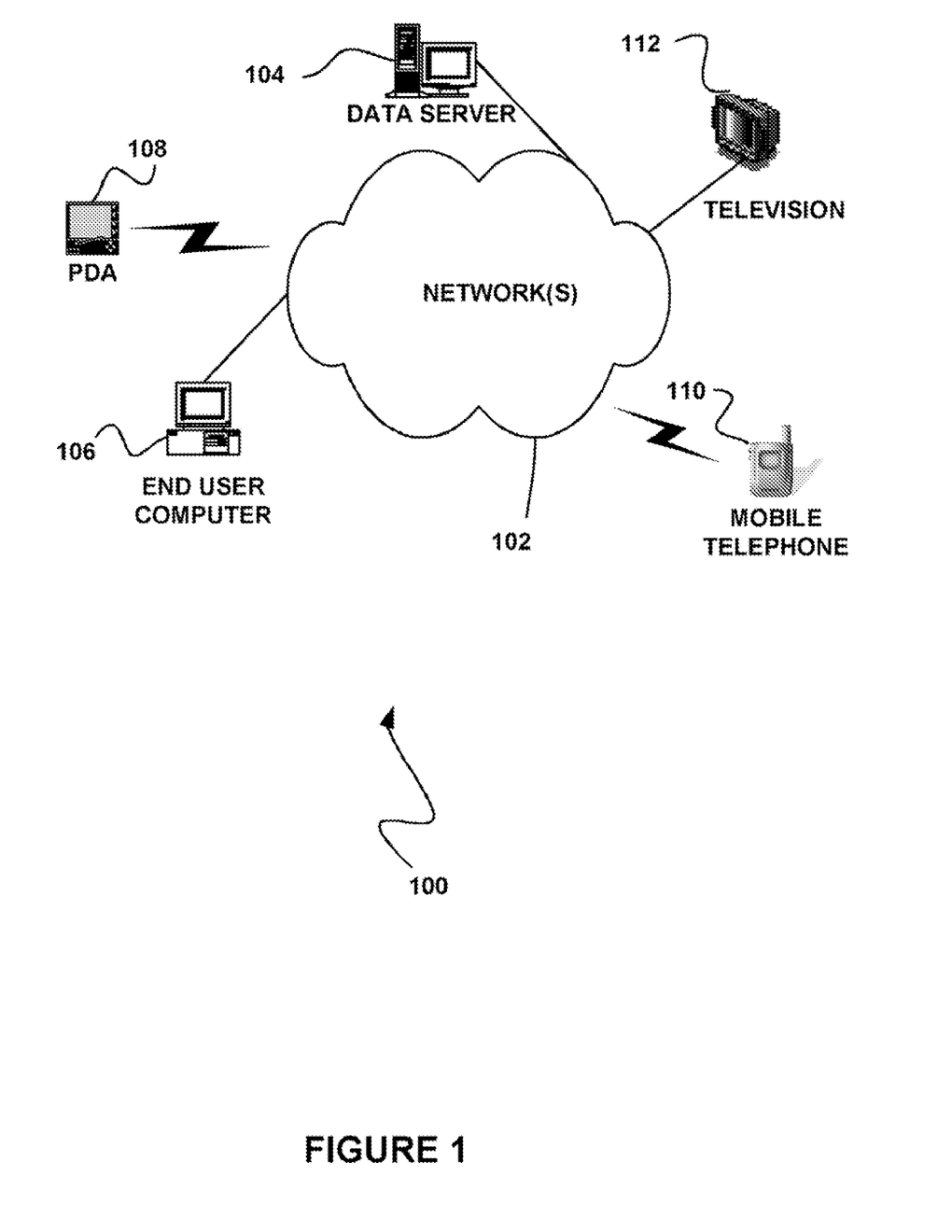
FIG. 1 illustrates a network architecture, in accordance with one embodiment.

FIG. 1 illustrates a network architecture 100, in accordance with one embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
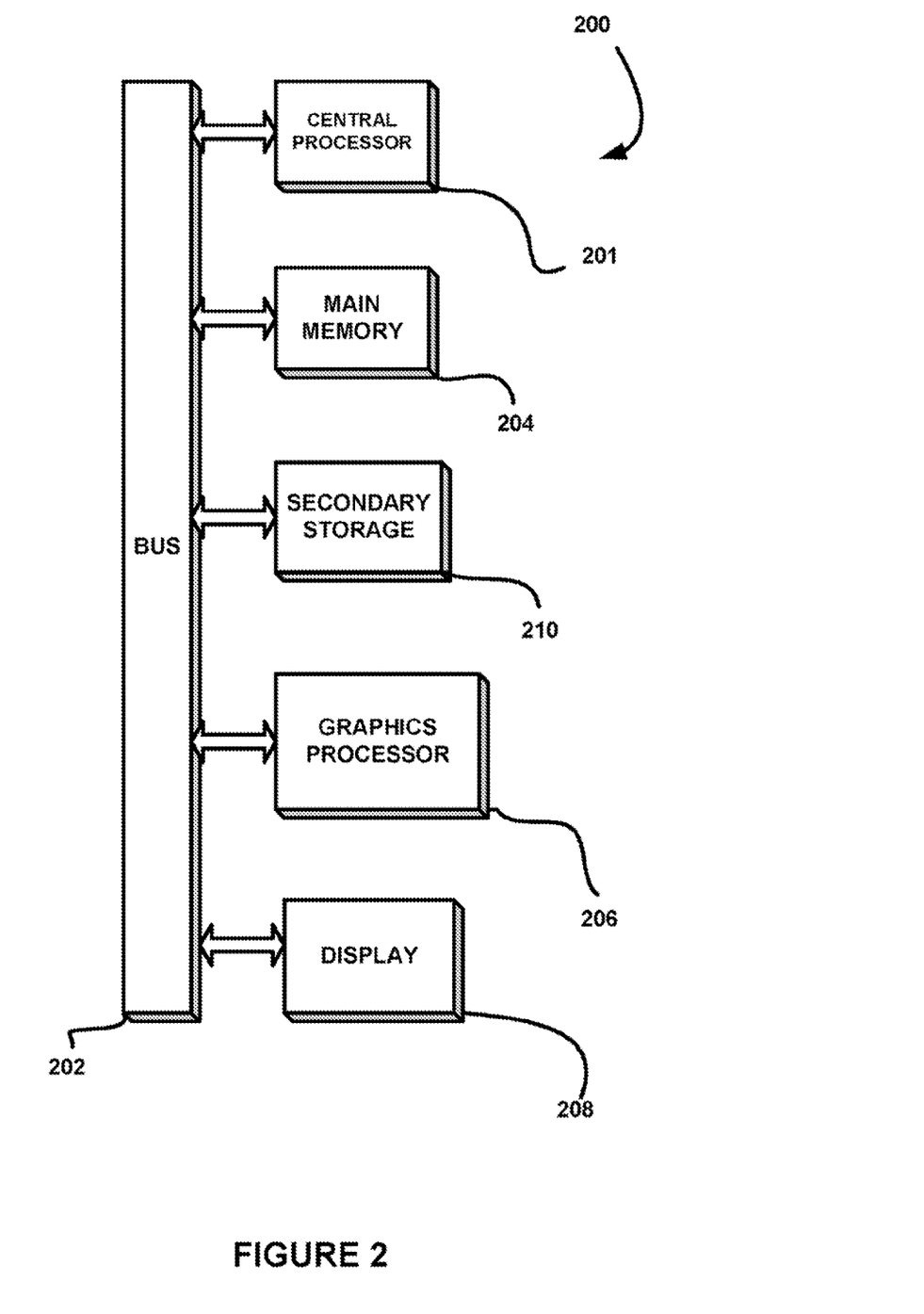
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the computer system 600 to perform various functions. Memory 204, storage 210 and/or any other storage are possible examples of computer-readable media.

Figure 3:
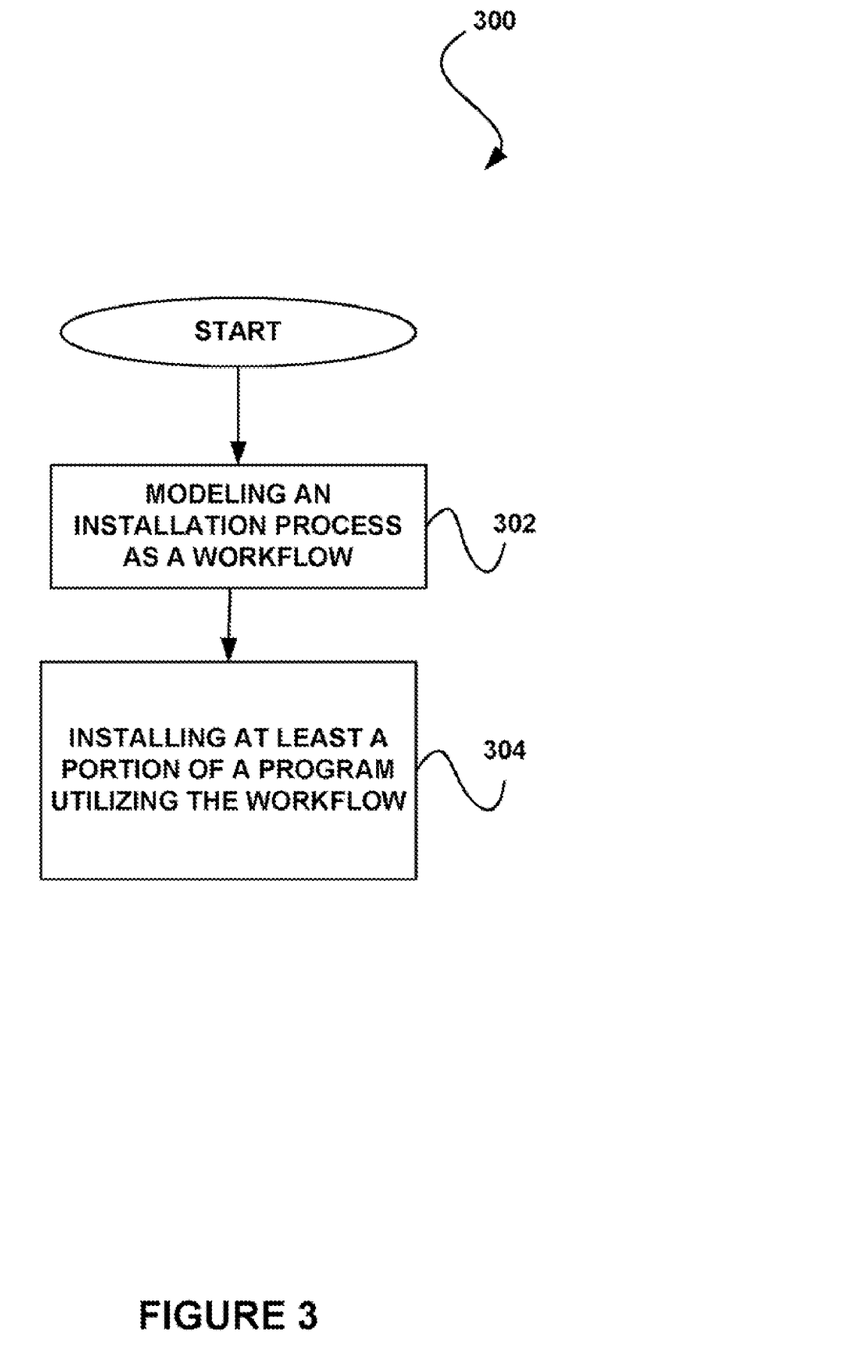
FIG. 3 shows a method for installing at least a portion of a program utilizing a workflow, in accordance with one embodiment.

FIG. 3 shows a method 300 for installing at least a portion of a program utilizing a workflow, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

As shown in operation 302, an installation process is modeled as a workflow. The installation process may include any process (e.g. one or more tasks, executable, etc.) utilized for installing at least a portion of a program. For example, the installation process may be utilized for installing a complete program and/or an update to a program on a device.

Further, the program may include an application program, a system program and/or any other program capable of being installed, at least in part, on a device. Further, such device may optionally include an of those described with respect to FIGS. 1 and/or 2. Of course, however, the device may include any entity capable of having a program installed thereon.

In one embodiment, for example, the installation process may include a plurality of parallel threads. For example, each of the threads may be associated with a portion of the installation program. In addition, each of the threads may be capable of executing independently. Thus, the plurality of threads may include a plurality of portions of the installation process capable of executing concurrently.

In another embodiment, the installation process may include a branching operation. Moreover, the branching operation may involve at least one condition. As an option, such condition may be identified from user input. For example, the installation process may execute the branching operation based on the condition. As another option, the branching operation may occur at runtime.

In yet another embodiment, the installation process may include error handling. Again, such error handling may optionally occur at runtime. Thus, the installation process may be capable of continuing execution even if an error is identified.

In still yet a further embodiment, the installation process may involve a plurality of roles and a plurality of activities. As an option, such roles may each be associated with at least one user. To accomplish this, each of the roles may be associated with at least one set of user login parameters. As another option, the roles may each be associated with a group, where such group identifies a plurality of users. In addition, the activities may include portions of the installation process (e.g. individual processes and/or tasks within the installation process, etc.).

Moreover, each role may have at least one activity associated therewith. Thus, the installation process may optionally only allow each of the roles to manage the at least one activity associated therewith. In this way, the installation process may be monitored and/or controlled by a plurality of users, based on the roles of such users. Of course, it should be noted that the installation process may include any combination of the techniques (e.g. threads, branching operation, error handling, etc.) described above.

The workflow after which the installation process is modeled may include a plurality of processes (e.g. tasks, etc.). For example, the workflow may separate the installation process into a plurality of individual processes. In particular, such plurality of processes may be defined within the workflow. Moreover, the plurality of processes may be defined within the workflow as a plurality of processes. As an option, the plurality of processes may include any parallel processes, linear processes, etc., or combination thereof.

Furthermore, each of the plurality of processes may be associated with at least one particular role (e.g. user, group of users, etc.), as described above. In one embodiment, the installation process may be modeled as a workflow utilizing a workflow definition language. Such workflow definition language may include, for example, an extended markup language processing definition language (XPDL), a workflow process definition language (WPDL), etc.

At least a portion of a program may then be installed, utilizing the workflow, as shown in operation 304. As described above, the program may include an application program, a system program, an upgrade to a pre-existing program update, etc.) and/or any other program capable of being installed. In addition, a plurality of the same or various programs may be installed utilizing the workflow.

As another option, the program may be installed, on a plurality of devices utilizing the workflow. Still yet, such devices may even include different devices. Such devices may optionally include those described above with respect to FIGS. 1 and/or 2, but of course may include any devices capable of having a program installed thereon.

In addition the program may be installed utilizing a network. Just by way of example, such network may include the network described above with respect to FIG. 1. Of course, however, the network may include any type of network capable of allowing a program to be installed on a computer connected thereto.

Thus, the workflow may be utilized to install at least a portion of the program such that flexibility of the installation process may be provided. Specifically, different roles may be utilized to monitor and/or control the installation process. Moreover, the workflow may be utilized to more efficiently install at least the portion of the program by providing parallel processing of individual processes within the installation process, for example.

More illustrative information will now be set forth regarding various optional architectures and uses in which the foregoing method 300 may or may not be implemented, per the desires of the user. It should be strongly noted that the following information is set forth for illustrative purposes and should not be construed, as limiting in any manner. Any of the following features may be optionally incorporated with or without the exclusion of other features described.

Figure 4:
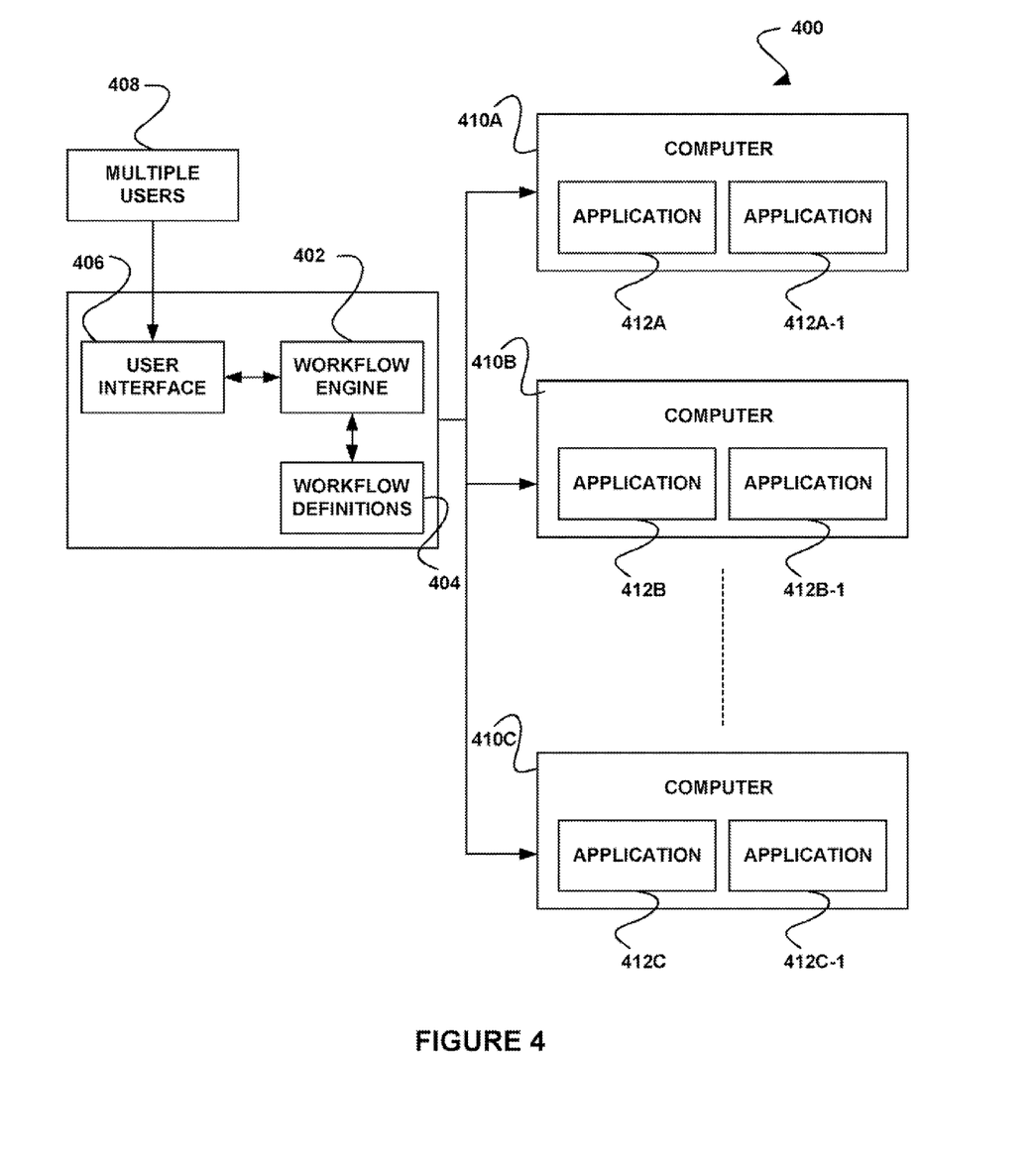
FIG. 4 shows a system for installing at least a portion of a program utilizing a workflow, in accordance with another embodiment.

FIG. 4 shows a system 400 for installing at least a portion of a program utilizing a workflow, in accordance with another embodiment. As an option, the system 400 may be implemented in the context of the details of FIGS. 1-3. Of course, however, the system 400 may be carried out in any desired environment. Again, the aforementioned definitions may equally apply to the description below.

As shown, multiple users 408 may utilize an installation process via a user interface 406 [e.g. graphical user interface (GUI), etc.] for installing at least a portion of a program. The multiple users 408 may be associated with a single computer or may each be associated with a plurality of computers. Thus, the installation process and associated user interface 406 may optionally be accessible over a network.

In addition, a workflow engine 402 may be utilized, for executing the installation process. For example, the workflow engine 402 may model the installation process as a workflow. Accordingly, the workflow may be executed by the workflow engine 402.

Moreover, the multiple users 408 may monitor and/or control the workflow of the installation process, utilizing the user interface 406. Specifically, the workflow may be displayed to the multiple users 408 utilizing the user interface 406. In this way, a visual representation of the installation process may be provided.

As also shown, the installation process may include workflow definitions 404. The workflow definitions 404 may include configuration in form a don for installing a program associated with the installation process. Such configuration information may be specific to the installation process, and may further be specific to a program associated with the installation process.

As another option, the workflow definitions 404 may include configuration information regarding multiple systems (e.g. computers, etc.) for which a program associated with the installation process is to be installed. Thus, various environments may be capable of utilizing the installation process via the workflow.

In particular, various databases associated with the installation process, and configuration information for a plurality of systems and computers may be provided to the workflow engine 402 utilizing the workflow definitions 404. Furthermore, the workflow definitions 404 may be received automatically in conjunction with the installation process. Of course, however, the workflow definitions 404 may also be received manually from a user.

In one example, the workflow definitions 404 may define roles (e.g. users, permissions, etc.) to be utilized with respect to associated activities (e.g. tasks, operations, processes, etc.) within the installation process. In one embodiment, each role may be associated with at least one activity within the workflow of the installation process. In another embodiment, the workflow definitions 404 may define parameters (e.g. location for the associated program to be installed, etc.) for installing the program associated with the installation process.

Additionally, the workflow definitions 404 may be loaded into the workflow engine 402. In this way, execution of the workflow may result in installation of a program associated with the installation process. Thus, it should be noted that the workflow definitions 404 may include any data capable of being utilized by the workflow engine 402 for executing the workflow.

Utilizing the workflow definitions 404, the workflow engine 402 may be utilized to execute the workflow of the installation process onto a plurality of computers 410A-C. The plurality of computers 410A-C may be in communication with the workflow engine 402 via a network. In addition, the plurality of computers may include any of the devices described above with respect to FIGS. 1 and/or 2, but of course may also include any device capable of having a program installed thereon.

As shown, each of the plurality of computers 410A-C may be associated with at least one application 412A-C, and 412A-1-412C-1. The applications 412A-C, and 412A-1-412C-1 may each include a pre-installed application, for example. Thus, the installation process may optionally be utilized for installing an update to the pre-installed application. In another embodiment, the applications 412A-C, and 412A-1-412C-1 may be installed on the plurality of computers 410A-C utilizing the installation process.

Thus, the workflow engine 402 may be utilized to handle complex installation processes by modeling the installation process as a workflow. Furthermore, the workflow engine 402 may allow for the flexibility of configuring such installation process by basing the workflow on received workflow definitions 404. In addition, the workflow engine 402 may provide addition flexibility whereby the installation process may ultimately be managed by a plurality of users 408 utilizing the user interface 406.

Figure 5:
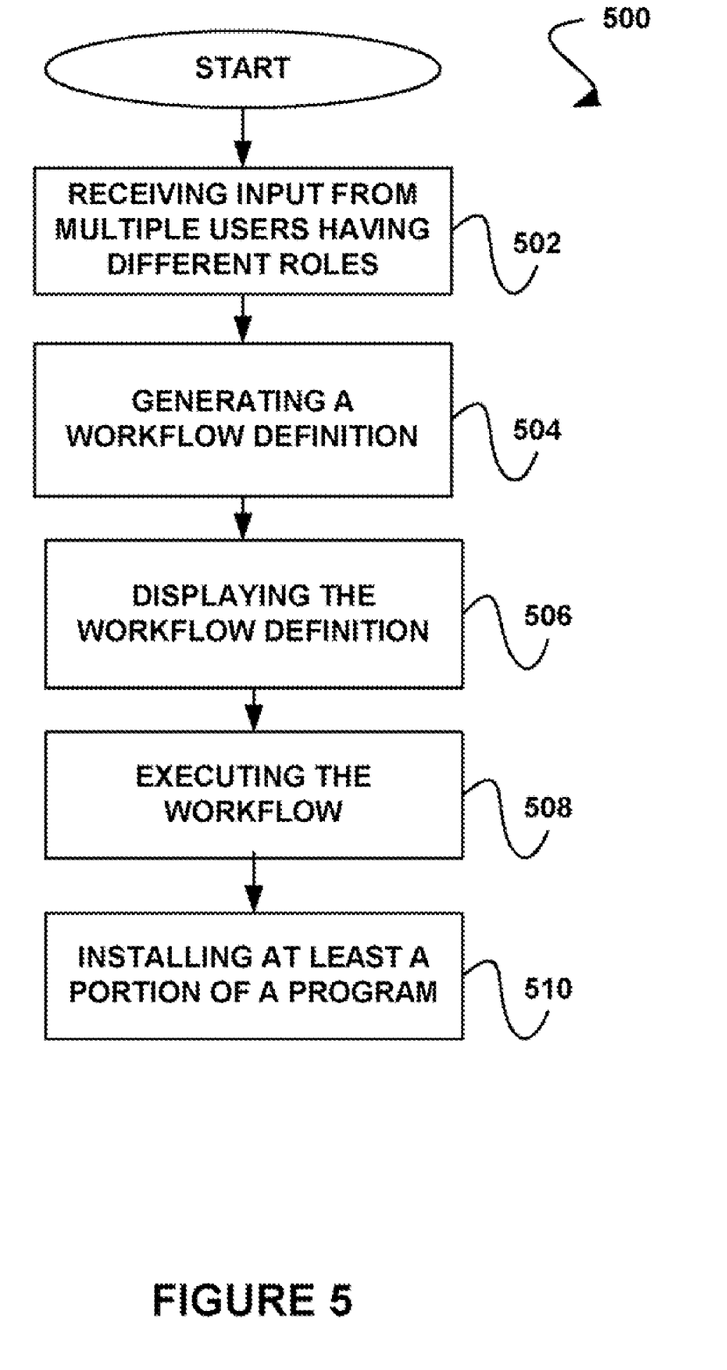
FIG. 5 shows a method for installing at least a portion of a program utilizing a workflow, in accordance with yet another embodiment.

FIG. 5 shows a method 500 for installing, at least a portion of a program utilizing a workflow, in accordance with yet another embodiment. As an option, the method 500 may be implemented in the context of the details of FIGS. 1-4. Of course, however, the method 500 may be carried out in any desired environment. Again, the aforementioned definitions may equally apply to the description below.

As shown in operation 502, input from multiple users having different roles is received. In one optional embodiment, the roles may each be associated with individual activities within an installation process. Thus, each user may provide input for activities associated therewith.

Such input may include configuration information. The configuration information may be provided for controlling at least a portion of the installation process. For example, the configuration information may provide a location for the program associated with the installation process to be installed. Of course, however, the input may include any other parameters capable of controlling at least a portion of the installation process.

A workflow definition may then be generated, as shown in operation 504. In particular, the workflow definition may be generated based, at least in part, on the received input. The workflow definition may also be generated based on an installation process associated therewith. Optionally, the workflow definition may define the workflow of the installation process.

Further, the workflow definition may be displayed, as shown in operation 506. Specifically, the workflow definition may optionally be displayed utilizing a GUI. As a result, at least one user may be able to view a visual representation of the workflow of the installation process and/or any data associated therewith. Further, the display of the workflow definition may allow a user to visually control the installation process.

Still yet, as shown in operation 508, the workflow associated with the workflow definition may be executed. Accordingly, the installation process may be executed utilizing the workflow. In one embodiment, multiple users may be capable of viewing the workflow during the execution of the workflow.

Moreover, the users may be capable of controlling the workflow during the execution of the workflow. For example, the users may provide input during the execution of the workflow. Such input may control activities associated with the users, such as for example in substantially the same manner as described above with respect to operation 502. In this way, the workflow may provide a more efficient, user friendly manner of executing the installation process.

Still yet, at least a portion of a program may be installed, as shown in operation 510. The program may be installed based on the execution of the workflow. In one embodiment, the program may be installed on a single computer. In another embodiment, the program may be installed on a plurality of different computers. Thus, the workflow utilized to install the program may be configured based on the input from the users to be utilized, with respect to different environments.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   modeling an installation process as a workflow, the installation process including a branching operation involving at least one condition that is dictated by at least one of a plurality of users;
   receiving input from the plurality of users, the plurality of users having different roles, where each of the roles are associated with individual activities within the installation process, the receiving input including:
   receiving a first input from a first user having a first role associated with at least one first activity within the installation process, the first input including first configuration information for controlling the at least one first activity in association with a plurality of devices and identifying a location of a program corresponding to the at least one first activity, and
   receiving a second input from a second user having a second role associated with at least one second activity within the installation process, the second input including second configuration information for controlling the at least one second activity in association with the plurality of devices;
   generating a workflow definition based on the received input from the plurality of users, the workflow definition defining parameters for installing at least a portion of the program associated with the installation process;
   displaying the workflow definition for allowing at least one of the plurality of users to visually control the installation process, utilizing a graphical user interface that is capable of displaying a visual representation of the workflow of the installation process;
   loading the workflow definition into a workflow engine;

executing the workflow of the installation process onto the plurality of devices, utilizing the workflow engine;

installing the at least a portion of a program utilizing the workflow; and during the execution of the workflow of the installation process onto the plurality of devices, receiving additional input from the plurality of users, the receiving additional user input including:

receiving, during the execution of the workflow of the installation process, a third input from the first user having the first role associated with the at least one first activity within the installation process, the third input including third configuration information for controlling the at least one first activity in association with the plurality of devices during the execution of the workflow of the installation process, and receiving, during the execution of the workflow of the installation process, a fourth input from the second user having the second role associated with the at least one second activity within the installation process, the fourth input including fourth configuration information for controlling the at least one second activity in association with the plurality of devices during the execution of the workflow of the installation process;

wherein the installation process only allows each of the roles to manage the associated individual activities.

2. The method of claim 1, wherein the portion of the program includes an upgrade.

3. The method of claim 1, wherein the installation process is modeled in a workflow definition language.

4. The method of claim 1, wherein a plurality of programs are installed utilizing the workflow.

5. The method of claim 1, wherein the plurality of devices includes different devices.

6. The method of claim 1, wherein the installation process includes a plurality of parallel threads.

7. The method of claim 1, wherein the installation process includes error handling.

8. The method of claim 7, wherein the error handling occurs at runtime.

9. The method of claim 1, wherein the program is installed utilizing a network.

10. The method of claim 1, wherein the workflow separates the installation process into a plurality of individual processes, the plurality of individual processes are defined within the workflow, and each of the plurality of individual processes is associated with at least one particular role.

11. The method of claim 1, wherein the workflow separates the installation process into a plurality of parallel processes.

12. The method of claim 1, wherein the workflow separates the installation process into a plurality of linear processes.

13. A computer program product embodied on a non-transitory computer readable medium, comprising:

computer code for modeling an installation process as a workflow, the installation process including a branching operation involving at least one condition that is dictated by at least one of a plurality of users;

computer code for receiving input from the plurality of users, the plurality of users having different roles, where each of the roles are associated with individual activities within the installation process, the receiving input including:

receiving a first input from a first user having a first role associated with at least one first activity within the installation process, the first input including first configuration information for controlling the at least one first activity in association with a plurality of devices and identifying a location of a program corresponding to the at least one first activity, and receiving a second input from a second user having a second role associated with at least one second activity within the installation process, the second input including second configuration information for controlling the at least one second activity in association with the plurality of devices;

computer code for generating a workflow definition based on the received input from the plurality of users, the workflow definition defining parameters for installing at least a portion of the program associated with the installation process;

computer code for displaying the workflow definition for allowing at least one of the plurality of users to visually control the installation process, utilizing a graphical user interface that is capable of displaying a visual representation of the workflow of the installation process;

computer code for loading the workflow definition into a workflow engine;

computer code for executing the workflow of the installation process onto the plurality of devices, utilizing the workflow engine;

computer code for installing the at least a portion of a program utilizing the workflow; and computer code for, during the execution of the workflow of the installation process onto the plurality of devices, receiving additional input from the plurality of users, the receiving additional user input including:

receiving, during the execution of the workflow of the installation process, a third input from the first user having the first role associated with the at least one first activity within the installation process, the third input including third configuration information for controlling the at least one first activity in association with the plurality of devices during the execution of the workflow of the installation process, and receiving, during the execution of the workflow of the installation process, a fourth input from the second user having the second role associated with the at least one second activity within the installation process, the fourth input including fourth configuration information for controlling the at least one second activity in association with the plurality of devices during the execution of the workflow of the installation process;

wherein the installation process only allows each of the roles to manage the associated individual activities.

14. A system, comprising:

a processor;

a memory device including instructions, that when executed by the processor, cause the processor to:

model an installation process as a workflow, the installation process including a branching operation involving at least one condition that is dictated by at least one of a plurality of users, receive input from the plurality of users, the plurality of users having different roles, where each of the roles are associated with individual activities within the installation process, the receiving input including:

receiving a first input from a first user having a first role associated with at least one first activity within the installation process, the first input including first configuration information for controlling the at least one first activity in association with a plurality of devices and identifying a location of a program corresponding to the at least one first activity, and receiving a second input from a second user having a second role associated with at least one second activity within the installation process, the second input including second configuration information for controlling the at least one second activity in association with the plurality of devices, generate a workflow definition based on the received input from the plurality of users, the workflow definition defining parameters for installing at least a portion of the program associated with the installation process, load the workflow definition into a workflow engine, execute the workflow of the installation process onto the plurality of devices, utilizing the workflow engine, install the at least a portion of a program utilizing the workflow, and during the execution of the workflow of the installation process onto the plurality of devices, receive additional input from the plurality of users, the receiving additional user input including:

receiving, during the execution of the workflow of the installation process, a third input from the first user having the first role associated with the at least one first activity within the installation process, the third input including third configuration information for controlling the at least one first activity in association with the plurality of devices during the execution of the workflow of the installation process, and receiving, during the execution of the workflow of the installation process, a fourth input from the second user having the second role associated with the at least one second activity within the installation process, the fourth input including fourth configuration information for controlling the at least one second activity in association with the plurality of devices during the execution of the workflow of the installation process; and a display for:

displaying the workflow definition for allowing at least one of the plurality of users to visually control the installation process, utilizing a graphical user interface that is capable of displaying a visual representation of the workflow of the installation process;

wherein the installation process only allows each of the roles to manage the associated individual activities.

* * * * *